(12) United States Patent
McCullough et al.

(10) Patent No.: US 8,455,379 B2
(45) Date of Patent: *Jun. 4, 2013

(54) CERAMIC ARTICLE

(75) Inventors: Thomas W. McCullough, Lake Jackson, TX (US); James E. Schuetz, Sanford, MI (US); Thomas D. Wood, Houghton, MI (US)

(73) Assignee: Century, Inc., Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,292

(22) Filed: Apr. 10, 2012

(65) Prior Publication Data

US 2012/0295784 A1    Nov. 22, 2012

Related U.S. Application Data

(63) Continuation of application No. 12/174,982, filed on Jul. 17, 2008, now Pat. No. 8,153,541.

(60) Provisional application No. 61/132,281, filed on Jun. 17, 2008.

(51) Int. Cl.
*C04B 35/00*      (2006.01)

(52) U.S. Cl.
USPC ....................................................... 501/95.2

(58) Field of Classification Search
USPC ................ 501/95.1, 95.2, 35, 92, 153, 154
See application file for complete search history.

(56) References Cited

U.S. PATENT DOCUMENTS

| | | |
|---|---|---|
| 2,262,242 A | 11/1941 | Lenox |
| 3,002,433 A | 10/1961 | Dunlap |
| 3,005,259 A | 10/1961 | Benya et al. |
| 3,007,553 A | 11/1961 | Sinclair et al. |
| 3,066,766 A | 12/1962 | Minor et al. |
| 3,090,114 A | 5/1963 | Sinclair |
| 3,126,306 A | 3/1964 | Sherman |
| 3,697,718 A | 10/1972 | Von Hollen et al. |

(Continued)

FOREIGN PATENT DOCUMENTS

| | | |
|---|---|---|
| EP | 0704414 A1 | 4/1996 |
| JP | 6340475 A | 12/1994 |

(Continued)

OTHER PUBLICATIONS

Japanese Application, English language abstract, and English language computer generated translation for JP 6340475 dated Dec. 13, 1994; 37 pages.

(Continued)

*Primary Examiner* — Emily Le
*Assistant Examiner* — Lynne Edmondson
(74) *Attorney, Agent, or Firm* — Howard & Howard Attorneys PLLC (57) ABSTRACT

A ceramic article comprises ceramic fibers having an aspect ratio of greater than or equal to 10:1, ceramic particles, and an inorganic binder comprising silica. Greater than 90 out of 100 ceramic fibers are randomly oriented in three dimensions in the ceramic article, and greater than 85 out of 100 ceramic fibers are spaced at least one ceramic fiber diameter away from an adjacent ceramic fiber. The ceramic article has a consistent density of from 0.9 to 1.1 $g/cm^3$ in x-, y-, and z-dimensions and has a uniform strength in three dimensions as measured in accordance with ASTM C1424.

20 Claims, 7 Drawing Sheets

U.S. PATENT DOCUMENTS

| | | | |
|---|---|---|---|
| 3,793,204 A | 2/1974 | Ardary et al. | |
| 3,841,448 A | 10/1974 | Norton, Jr. | |
| 3,932,568 A | 1/1976 | Watts et al. | |
| 4,026,690 A | 5/1977 | McClellan | |
| 4,141,481 A | 2/1979 | Van Petten | |
| 4,266,638 A | 5/1981 | Petersen et al. | |
| 4,312,672 A | 1/1982 | Blahak et al. | |
| 4,331,628 A | 5/1982 | Ziegler | |
| 4,448,833 A | 5/1984 | Yamaguchi et al. | |
| 4,577,734 A | 3/1986 | Williams | |
| 4,679,681 A | 7/1987 | Creydt et al. | |
| 4,702,877 A | 10/1987 | Davis, Jr. | |
| 4,710,252 A | 12/1987 | Kadunce | |
| 4,909,301 A | 3/1990 | Riordan et al. | |
| 4,935,178 A * | 6/1990 | Esposito et al. | 264/641 |
| 5,002,836 A * | 3/1991 | Dinwoodie et al. | 428/614 |
| 5,068,076 A | 11/1991 | Weaver et al. | |
| 5,104,598 A | 4/1992 | Dolle | |
| 5,108,964 A | 4/1992 | Corbett et al. | |
| 5,112,553 A | 5/1992 | Nedzu | |
| 5,153,057 A | 10/1992 | Corbett et al. | |
| 5,188,787 A | 2/1993 | King et al. | |
| 5,299,667 A | 4/1994 | Hammond | |
| 5,325,941 A | 7/1994 | Farinacci et al. | |
| 5,335,712 A | 8/1994 | Corbett et al. | |
| 5,342,463 A | 8/1994 | Addeo et al. | |
| 5,382,399 A | 1/1995 | Moret de Rocheprise et al. | |
| 5,433,511 A | 7/1995 | Wei | |
| 5,458,181 A | 10/1995 | Corbett et al. | |
| 5,511,603 A | 4/1996 | Brown et al. | |
| 5,529,620 A * | 6/1996 | Corbett et al. | 106/272 |
| 5,535,857 A | 7/1996 | Barlow | |
| 5,574,957 A | 11/1996 | Barnard et al. | |
| 5,586,963 A | 12/1996 | Lennon et al. | |
| 5,591,292 A | 1/1997 | Blomqvist | |
| 5,637,168 A | 6/1997 | Carlson | |
| 5,662,145 A | 9/1997 | Stagg | |
| 5,798,013 A | 8/1998 | Brandenburger | |
| 5,876,659 A | 3/1999 | Yasutomi et al. | |
| 5,878,849 A | 3/1999 | Prunier, Jr. et al. | |
| 5,900,194 A | 5/1999 | Ashton | |
| 5,919,493 A | 7/1999 | Sheppard et al. | |
| 5,957,251 A | 9/1999 | Jones et al. | |
| 6,042,935 A | 3/2000 | Krenkel et al. | |
| 6,169,048 B1 | 1/2001 | Sjogren et al. | |
| 6,180,037 B1 | 1/2001 | Andersen et al. | |
| 6,180,258 B1 | 1/2001 | Klier | |
| 6,306,235 B1 | 10/2001 | Henderson | |
| 6,309,743 B1 | 10/2001 | Fujita | |
| 6,344,160 B1 | 2/2002 | Holtzberg | |
| 6,386,341 B1 | 5/2002 | Martin | |
| 6,413,069 B2 | 7/2002 | Oono et al. | |
| 6,458,466 B1 | 10/2002 | Jones et al. | |
| 6,460,597 B1 | 10/2002 | McCullough et al. | |
| 6,488,802 B1 | 12/2002 | Beasley et al. | |
| 6,503,441 B2 | 1/2003 | Corman et al. | |
| 6,530,458 B1 | 3/2003 | Rau, III | |
| 6,537,405 B1 | 3/2003 | Henderson et al. | |
| 6,539,644 B1 | 4/2003 | Araya | |
| 6,548,000 B1 | 4/2003 | Gobled et al. | |
| 6,796,365 B1 | 9/2004 | McCullough et al. | |
| 6,989,067 B2 | 1/2006 | Armstrong, Jr. et al. | |
| 7,052,637 B1 | 5/2006 | Strand et al. | |
| 7,080,935 B2 | 7/2006 | Innerebner et al. | |
| 7,126,257 B2 | 10/2006 | Kampe et al. | |
| 7,163,653 B2 | 1/2007 | Ehnert | |
| 7,175,796 B2 | 2/2007 | Ehnert | |
| 7,208,108 B2 | 4/2007 | Otsuka et al. | |
| 7,216,746 B2 | 5/2007 | Yamamoto et al. | |
| 7,290,506 B2 | 11/2007 | Rau, III et al. | |
| 7,357,976 B2 | 4/2008 | Yamamura et al. | |
| 7,459,110 B2 | 12/2008 | Lenke et al. | |
| 7,793,703 B2 | 9/2010 | Wood et al. | |
| 8,016,018 B2 | 9/2011 | Wood et al. | |
| 8,075,827 B2 | 12/2011 | Loukus et al. | |
| 8,153,541 B2 * | 4/2012 | McCullough et al. | 501/95.2 |
| 2001/0000333 A1 | 4/2001 | Nakao et al. | |
| 2003/0092557 A1 | 5/2003 | Aichele et al. | |
| 2003/0180172 A1 | 9/2003 | Oda | |
| 2003/0180538 A1 | 9/2003 | Gray | |
| 2004/0035547 A1 | 2/2004 | Grether | |
| 2004/0048095 A1 | 3/2004 | Crocco et al. | |
| 2004/0118547 A1 | 6/2004 | Brown et al. | |
| 2004/0132607 A1 | 7/2004 | Wood et al. | |
| 2004/0141405 A1 | 7/2004 | Blach et al. | |
| 2004/0145095 A1 | 7/2004 | McCollum et al. | |
| 2004/0146709 A1 | 7/2004 | Tomoto | |
| 2004/0173291 A1 | 9/2004 | Rozenoyer et al. | |
| 2005/0011591 A1 | 1/2005 | Murty et al. | |
| 2005/0183909 A1 | 8/2005 | Rau, III et al. | |
| 2005/0217950 A1 | 10/2005 | Jolley et al. | |
| 2005/0241434 A1 | 11/2005 | Persson et al. | |
| 2005/0253302 A1 | 11/2005 | Nun et al. | |
| 2005/0260408 A1 | 11/2005 | Anand et al. | |
| 2006/0027429 A1 | 2/2006 | Knight et al. | |
| 2006/0057356 A1 | 3/2006 | Yamamura et al. | |
| 2006/0062986 A1 | 3/2006 | Magario et al. | |
| 2006/0243421 A1 | 11/2006 | Zhang et al. | |
| 2006/0263574 A1 | 11/2006 | Tsunekawa et al. | |
| 2006/0293454 A1 | 12/2006 | Nadella et al. | |
| 2006/0293457 A1 | 12/2006 | Nadella et al. | |
| 2007/0131374 A1 | 6/2007 | Zhang et al. | |
| 2007/0152364 A1 | 7/2007 | Zuberi et al. | |
| 2007/0170016 A1 | 7/2007 | Yamamoto et al. | |
| 2008/0135359 A1 | 6/2008 | Basirico et al. | |
| 2008/0220234 A1 | 9/2008 | Ko et al. | |
| 2008/0264595 A1 | 10/2008 | Bushby | |
| 2008/0310989 A1 | 12/2008 | Tschofen | |
| 2009/0312174 A1 | 12/2009 | McCullough et al. | |
| 2010/0001231 A1 | 1/2010 | Loukus et al. | |
| 2010/0187053 A1 | 7/2010 | Botsch et al. | |
| 2012/0080277 A1* | 4/2012 | Wood et al. | 188/218 R |
| 2012/0183707 A1* | 7/2012 | Anderson et al. | 428/34.5 |

FOREIGN PATENT DOCUMENTS

| | | |
|---|---|---|
| WO | WO 2004018718 A1 | 3/2004 |
| WO | WO 2006113762 A2 | 10/2006 |
| WO | WO 2007033378 A1 | 3/2007 |

OTHER PUBLICATIONS

Article entitled "Liquid State Fabrication of Metal Matrix Composites" from the website created by Dr. Dmitri Kopeliovich; dated Feb. 14, 2008; http://www.substech.com/dokuwiki/doku.php?id=liquid.sub.--state.sub.--fab- rication.sub.--of.sub.--metal.sub.--matrix.sub.--composites.

Article entitled "Emerging Applications of Ceramic and Metal Matrix Composites" from the website About.com: Composites/Plastics; dated Sep. 19, 2005; http://composite.about.com/od/aboutcompositesplastics/1/aa03020- 5.htm.

Article entitled "Optimization of the Squeeze Casting Process for Aluminum Alloy Parts" from the Office of Industrial Technologies Energy Efficiency and Renewable Energy , US Department of Energy; dated Sep. 10, 2006; www.dmseg5.case.edu/Groups/CMPL/projects/cwru.sub.--optimize.sub.--al.pdf.

Article entitled "Metal Matrix Composites" from the website Composites-By-Design; dated Mar. 21, 2008; http://www.composites-by-design.com/metal-matrix.htm.

Article entitled "Metal Matrix Composite" from Wikipedia, the free encyclopedia; dated Aug. 8, 2004; http://en.wikipedia.org/ wiki/Metal.sub.--matrix.sub.--composite.

* cited by examiner

CERAMIC ARTICLE

RELATED APPLICATIONS

This application is a continuation of U.S. Non-Provisional patent application Ser. No. 12/174,982, which was filed on Jul. 17, 2008, is now U.S. Pat. No. 8,153,541, and claims priority to and all advantages of U.S. Provisional Patent Application No. 61/132,281, which itself was filed on Jun. 17, 2008. All of the aforementioned are expressly incorporated herein by reference.

BACKGROUND OF THE INVENTION

1. Field of the Invention

The subject invention generally relates to a ceramic article. More specifically, the subject invention relates to a ceramic article for use in a metal matrix composite.

2. Description of the Related Art

Metal matrix composites (MMCs) are composite materials that comprise at least two constituents, one of which is a metal or an alloy. As compared to monolithic materials comprising a single constituent, MMCs have a higher strength-to-density ratio, a higher stiffness-to-density ratio, better fatigue resistance, and higher strength at elevated temperatures. MMCs also have a higher wear resistance than monolithic materials. As such, MMCs are typically useful for applications requiring wear resistance and strength, e.g., brakes.

MMCs are produced by augmenting a metal matrix with reinforcing materials. The metal matrix and reinforcing materials are typically chosen to optimize mechanical and physical properties of the MMCs. Numerous combinations of metal matrices and reinforcing materials are known in the art. Effective metal matrices comprise aluminum, magnesium, titanium, copper, zinc, and superalloys. Effective reinforcing materials comprise boron carbide, silicon carbide, alumina, and graphite, and are available in the form of continuous fibers, discontinuous fibers, particles, and whiskers.

One method of producing MMCs includes infiltrating a ceramic article with the metal or alloy to form the MMC. Ceramic articles are often a fabric or prearranged fibrous configuration of reinforcing materials that are produced prior to metal infiltration.

Many existing ceramic articles comprise reinforcing materials oriented in only two dimensions. As such, many existing ceramic articles suffer from fatigue and/or failure in a third, non-reinforced dimension and do not exhibit uniform strength in three dimensions.

Additionally, many existing ceramic articles comprise small reinforcing materials to enable consistent mixing during ceramic article formation. However, consistent mixing often becomes difficult as the size of reinforcing materials decreases. Small reinforcing materials also often limit the mechanical and physical properties, such as wear resistance, of MMCs including existing ceramic articles.

Many existing ceramic articles also exhibit inconsistent density as a result of inconsistent mixing. Since consistent mixing ideally includes both dispersion of reinforcing material agglomerates and uniform distribution of reinforcing materials throughout the ceramic article, inconsistent mixing results in nonuniform distribution of reinforcing materials in existing ceramic articles and contributes to ceramic articles having inconsistent density, physical properties, and performance. Ceramic articles having inconsistent density wear more readily than ceramic articles having consistent density and are not useful for applications requiring high wear resistance. Additional reinforcing materials must often be added to existing ceramic articles after formation to remedy such inconsistent density, which increases production costs of existing ceramic articles.

Further, many existing ceramic articles are heavy due to necessary additional reinforcing materials included to compensate for inconsistent mixing of reinforcing materials. Heavy ceramic articles are often not suitable for applications requiring lightweight components, such as automotive or aeronautical applications.

Finally, many existing ceramic articles suffer from weak points caused by entanglement and conglomeration of reinforcing materials. Ceramic articles including entanglements and conglomerations are not as strong and stiff as ceramic articles free from such weak points. MMCs formed from ceramic articles including entanglement and conglomeration also suffer from inadequate metal infiltration due to blockages caused by such entanglement and conglomeration of reinforcing materials.

Due to the inadequacies of existing ceramic articles, there remains an opportunity to provide a ceramic article that improves upon existing ceramic articles for use in metal matrix composites.

SUMMARY OF THE INVENTION AND ADVANTAGES

The subject invention provides a ceramic article comprising ceramic particles, ceramic fibers having an aspect ratio of greater than or equal to 10:1, and an inorganic binder comprising silica Greater than 90 out of 100 ceramic fibers are randomly oriented in three dimensions in the ceramic article, and greater than 85 out 100 ceramic fibers are spaced at least one ceramic fiber diameter away from an adjacent ceramic fiber. The ceramic article has a consistant density of 0.9 to 1.1 $g/cm^3$ in x-, y-, and z-dimensions and has a uniform strength in three dimensions as measured in according with ASTM C1414.

The ceramic article of the subject invention exhibits uniform strength and minimal fatigue and/or failure in three dimensions. The ceramic article exhibits consistent density, even while including ceramic fibers having an aspect ratio of greater than 3:1, and provides excellent wear resistance to metal matrix composites including the ceramic article. Further, the ceramic article is lightweight and suitable for applications requiring lightweight components. The ceramic article also minimizes weak points caused by entanglement and conglomeration of the ceramic particles and ceramic fibers and exhibits excellent strength and stiffness. Finally, the ceramic article minimizes infiltration blockages caused by entanglement and conglomeration and enables excellent metal infiltration for efficient production of metal matrix composites.

BRIEF DESCRIPTION OF THE DRAWINGS

Other advantages of the present invention will be readily appreciated, as the present invention becomes better understood by reference to the following detailed description when considered in connection with the accompanying drawings wherein.

DETAILED DESCRIPTION OF THE INVENTION

Figure 1:
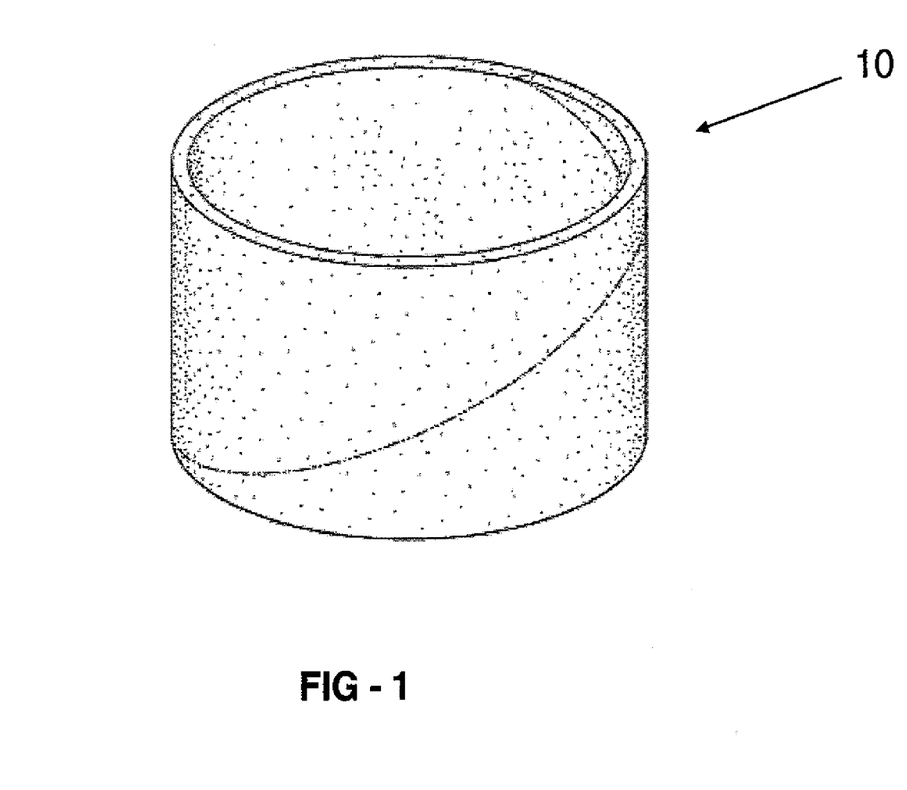
FIG. 1 is a perspective view of a ceramic article in hollow cylinder form.
Figure 3:
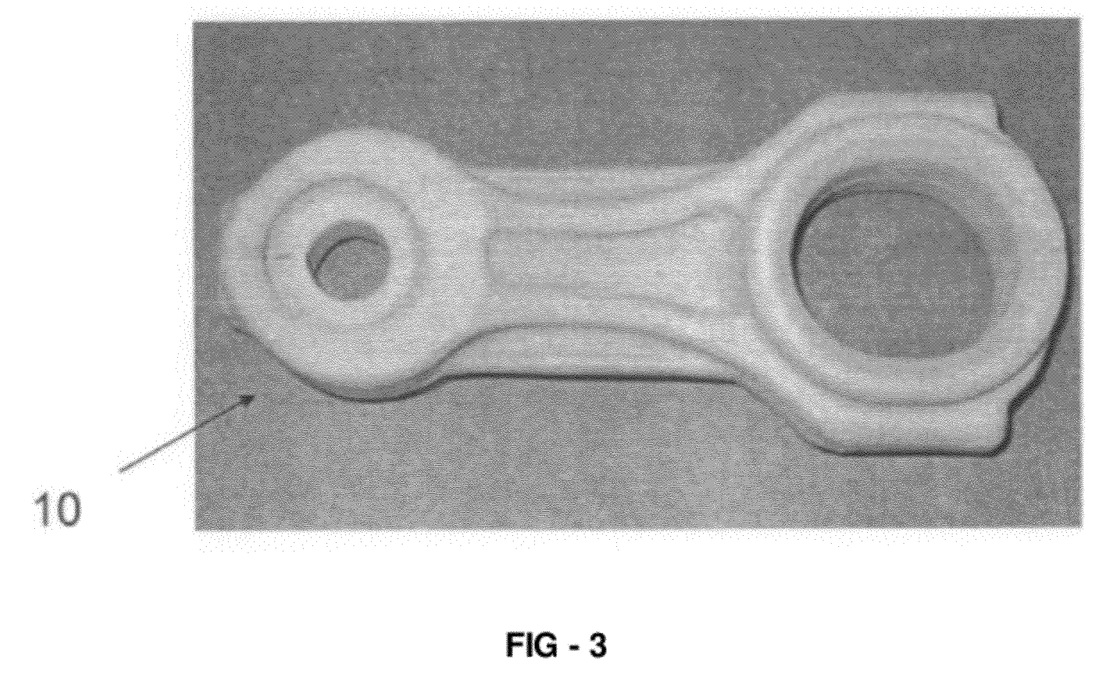
FIG. 3 is a perspective view of a ceramic article in connecting rod form.

The present invention includes a ceramic article 10, as set forth in FIGS. 1 and 3, and a method of forming the ceramic article 10. The ceramic article 10 is typically used to form a metal matrix composite and is typically useful for automotive applications requiring excellent strength and wear resistance at elevated temperatures. However, it is to be appreciated that the ceramic article 10 of the present invention can have applications beyond automotive applications, such as in aeronautical applications.

Figure 5:
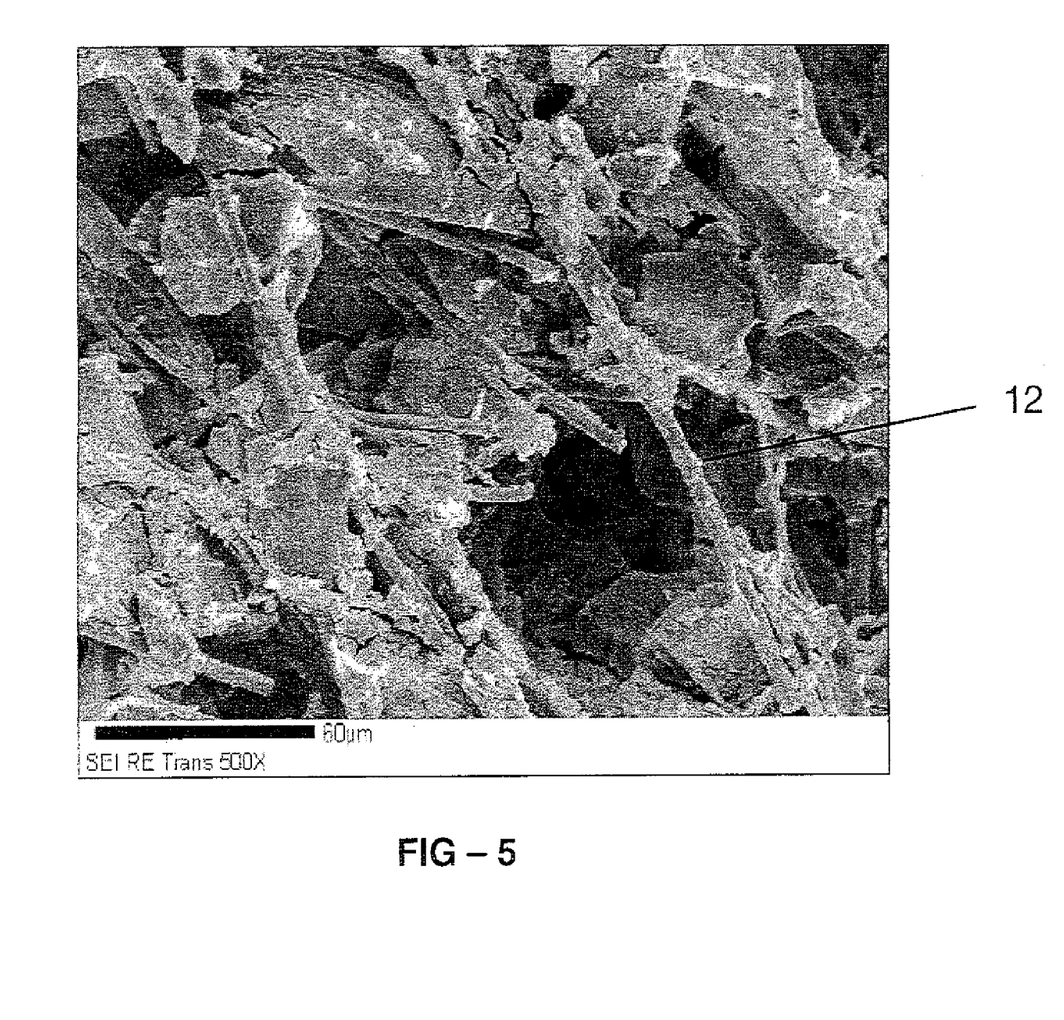
FIG. 5 is a scanning electron image of a ceramic article at a magnification of 500×.

As set forth in FIG. 5, the ceramic article 10 comprises ceramic fibers 12 having an aspect ratio of greater than 3:1 and ceramic particles. The ceramic fibers 12 are typically included in the ceramic article 10 to reduce the density, enhance metal infiltration, and optimize strength of the ceramic article 10, as set forth in more detail below. The ceramic fibers 12 typically comprise an element from period 2, 3, 4, or 5 of the periodic table of the elements. Typically, the ceramic fibers 12 comprise aluminum, silicon, oxygen, zirconium, or carbon. The ceramic fibers 12 are typically selected from the group of alumina-silica fibers, alumina-silica-zirconia fibers, carbon-graphite fibers, and combinations thereof. Carbon-graphite fibers are typically selected for applications requiring high strength.

The ceramic fibers 12 have an aspect ratio of greater than 3:1. In one embodiment, the ceramic fibers 12 have an aspect ratio of greater than or equal to 5:1. In another embodiment, the ceramic fibers 12 have an aspect ratio of greater than or equal to 10:1. It is to be appreciated that the term aspect ratio means a ratio of the longer dimension, i.e., length, of the ceramic fibers 12 to the shorter dimension, i.e., diameter, of the ceramic fibers 12. The ceramic fibers 12 typically have a length of from 5 to 500, more typically from 50 to 250 μm. The ceramic fibers 12 typically have a diameter of from 1 to 20, more typically from 2 to 5 μm. Without intending to be limited by theory, it is believed that ceramic fibers 12 having an aspect ratio of greater than 3:1 decrease the density of the ceramic article 10 and optimize metal infiltration of the ceramic article 10 by spacing out the ceramic particles. As set forth in FIG. 5, the ceramic fibers 12 define void space between the ceramic particles, which allows metal to flow between the ceramic particles and substantially infiltrate the ceramic article 10 during fabrication of the metal matrix composite.

As set forth in FIG. 5, the ceramic fibers 12 are substantially randomly oriented in three dimensions in the ceramic article 10. It is to be appreciated that the term substantially means that greater than 90 out of 100 ceramic fibers 12 are randomly oriented in three dimensions in the ceramic article 10. It is further to be appreciated that the term randomly oriented means that adjacent ceramic fibers 12 are disposed in different dimensions and that adjacent ceramic fibers 12 are free from a pattern of alignment. More specifically, adjacent ceramic fibers 12 oriented in different dimensions are typically present in the ceramic article 10 in an amount of greater than 85 parts by volume based on 100 parts by volume of the ceramic article 10. Further, adjacent ceramic fibers 12 oriented in the same dimension are typically present in the ceramic article 10 in an amount of from 0.1 to 5 parts by volume based on 100 parts by volume of the ceramic article 10. Without intending to be limited by theory, it is believed that ceramic fibers 12 substantially randomly oriented in three dimensions provide the ceramic article 10 with uniform strength in three dimensions. As such, the ceramic article 10 of the present invention is typically free from fatigue and/or failure in a third, non-reinforced dimension as compared to ceramic articles 10 with ceramic fibers 12 oriented in only two dimensions.

The ceramic fibers 12 are typically substantially homogeneously dispersed in the ceramic article 10. It is to be appreciated that the term substantially means greater than 90 out of 100 ceramic fibers 12 in the ceramic article 10 are homogeneously dispersed in the ceramic article 10. Further, it is to be appreciated that the term homogeneously dispersed means that greater than 85% by volume of the ceramic fibers 12 in the ceramic article 10 are uniformly distributed on a scale of twice the diameter of the ceramic fiber. That is, greater than 85 out of 100 ceramic fibers 12 are spaced at least one ceramic fiber diameter away from an adjacent ceramic fiber. Without intending to be limited by theory, it is believed that ceramic fibers 12 that are substantially homogeneously dispersed in the ceramic article 10 provide the ceramic article 10 with uniform density and, consequently, uniform strength. That is, the ceramic article 10 is typically free from entanglements and conglomerations of ceramic fibers 12 that cause weak points that typically decrease strength and stiffness of ceramic articles 10. Since the ceramic article 10 exhibits uniform density, it is typically unnecessary to add additional ceramic fibers 12 to the ceramic article 10 after formation to remedy inconsistent density, thereby minimizing production costs of the ceramic article 10. Additionally, since the ceramic article 10 of the present invention is typically free from blockages caused by entanglements and conglomerations of ceramic fibers 12, the ceramic article 10 of the present invention also minimizes infiltration blockages caused by entanglement and conglomeration and enables excellent metal infiltration for efficient production of metal matrix composites.

Figure 2:
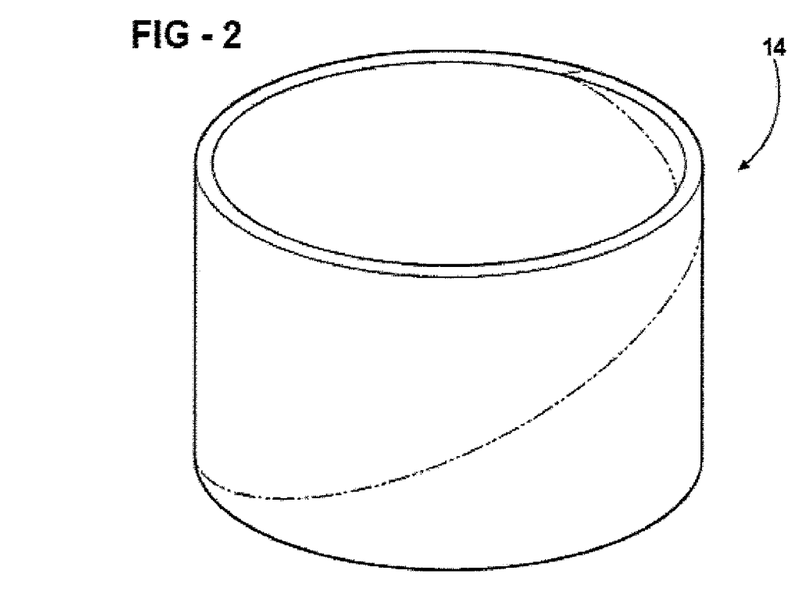
FIG. 2 is a perspective view of an uncured ceramic article in hollow cylinder form.

An uncured ceramic article 14, i.e., a ceramic article that has not been cured or sintered, is shown schematically in FIG. 2. During curing or sintering, any liquid components of the uncured ceramic article 14 typically burn off, and solids remain in the ceramic article 10, as set forth in more detail below. That is, after curing or sintering, solids are typically present in the ceramic article 10 in an amount of from 20 to 50 parts by volume based on 100 parts by volume of the ceramic article 10. Solids are more typically present in the ceramic article 10 in an amount of from 30 to 40 parts by volume based on 100 parts by volume of the ceramic article 10. Air is typically present in the ceramic article 10 in an amount of from 50 to 80 parts by volume based on 100 parts by volume of the ceramic article 10. Air is more typically present in the ceramic article 10 in an amount of from 60 to 70 parts by volume based on 100 parts by volume of the ceramic article 10.

The ceramic fibers 12 are typically present in the uncured ceramic article 14 in an amount of from 5 to 25 parts by weight based on 100 parts by weight of solids in the uncured ceramic article 14. The ceramic fibers 12 typically remain as solids in the ceramic article 10 after curing or sintering. That is, the ceramic fibers 12 are typically present in the ceramic article 10 in an amount of from 3 to 15 parts by volume based on 100 parts by volume of the ceramic article 10. The ceramic fibers 12 are more typically present in the ceramic article 10 in an amount of from 5 to 10 parts by volume based on 100 parts by volume of the ceramic article 10. A specific example of a ceramic fiber is an alumina-silica fiber, commercially available from Thermal Ceramics Inc. of Atlanta, Ga.

The ceramic particles typically provide the ceramic article 10 with excellent stiffness and wear resistance and typically comprise an element from period 2, 3, or 4 of the periodic table of the elements. The ceramic particles more typically comprise an element from period 2 or 3 of the periodic table of the elements. Typically, the ceramic particles comprise silicon, oxygen, carbon, aluminum, or boron. The ceramic particles are typically selected from the group of silicon carbide, alumina, boron carbide, and combinations thereof.

The ceramic particles typically each have a reference dimension of from 5 to 50 µm, more typically 5 to 30 µm. One skilled in the art typically selects ceramic particles having a reference dimension of from 5 to 10 µm, i.e., a smaller ceramic particle, for applications requiring high strength and stiffness. In contrast, one skilled in the art typically selects ceramic particles having a reference dimension of from 10 to 30 µm, i.e., a larger ceramic particle, for applications requiring high wear resistance. One skilled in the art typically combines smaller ceramic particles and larger ceramic particles for applications requiring high strength, stiffness, and wear resistance.

The ceramic particles are typically present in the uncured ceramic article 14 in an amount of from 50 to 75, more typically 60 to 70 parts by weight based on 100 parts by weight of solids in the uncured ceramic article 14. The ceramic particles typically remain as solids in the ceramic article 10 after curing or sintering. That is, the ceramic particles are typically present in the ceramic article 10 in an amount of from 15 to 30 parts by volume based on 100 parts by volume of the ceramic article 10. The ceramic particles are more typically present in the ceramic article 10 in an amount of from 22 to 28 parts by volume based on 100 parts by volume of the ceramic article 10. A specific example of a ceramic particle is silicon carbide, commercially available from Washington Mills of Niagara Falls, N.Y.

The ceramic article 10 may further comprise a binder component. Without intending to be limited by theory, it is believed that the binder component provides the ceramic article 10 with strength. The binder component typically comprises an organic binder and an inorganic binder. More specifically, without intending to be limited by theory, it is believed that the organic binder provides the uncured ceramic article 14 with strength, whereas the inorganic binder provides a cured ceramic article, i.e., the ceramic article 10, with strength.

The organic binder of the binder component typically comprises a first component and a second component. The first component is typically a starch. Without intending to be limited by theory, it is believed that the first component provides the uncured ceramic article 14 with strength and reduces adhesion of the second component. The first component is typically present in the uncured ceramic article 14 in an amount of from 1 to 10 parts by weight based on 100 parts by weight of solids in the uncured ceramic article 14. A specific example of a first component is starch, commercially available as Westar 3+ Cationic Starch from Wesbond Corporation of Wilmington, Del.

The second component of the organic binder typically comprises a cellulose ether. The cellulose ether typically exhibits reverse thermal gelation and provides lubricity during formation of the uncured ceramic article 14. Without intending to be limited by theory, it is believed that the cellulose ether also typically provides surface activity, plasticity, uniform rheology, and uniform distribution of air during formation of the uncured ceramic article 14. It is also believed that the cellulose ether also typically provides the uncured ceramic article 14 with strength. The cellulose ether is typically selected from the group of methyl cellulose, hydroxypropylmethylcellulose, hydroxybutylmethylcellulose, and combinations thereof. The second component is typically present in the uncured ceramic article 14 in an amount of from 0.5 to 10 parts by weight based on 100 parts by weight of solids in the uncured ceramic article 14. A suitable second component is hydroxypropylmethylcellulose, commercially available under the trade name Methocel™ A4M from The Dow Chemical Company of Midland, Mich.

The organic binder is typically present in the uncured ceramic article 14 in an amount of from 0.5 to 25 parts by weight based on 100 parts by weight of solids in the uncured ceramic article 14.

The inorganic binder of the binder component is typically silica. Without intending to be limited by theory, it is believed that the inorganic binder provides the ceramic article 10 with strength. The inorganic binder is typically present in the uncured ceramic article 14 in an amount of from 2 to 10 parts by weight based on 100 parts by weight of solids in the uncured ceramic article 14. The inorganic binder typically remains as solids in the ceramic article 10 after curing or sintering. That is, the inorganic binder is typically present in the ceramic article 10 in an amount of from 2 to 5 parts by volume based on 100 parts by volume of the ceramic article 10. A suitable inorganic binder is silica, commercially available under the trade name Bindzil 1440 Colloidal Silica from Wesbond Corporation of Wilmington, Del.

The binder component is typically present in the uncured ceramic article 14 in an amount of from 5 to 35 parts by weight based on 100 parts by weight of solids in the uncured ceramic article 14.

Figure 4:
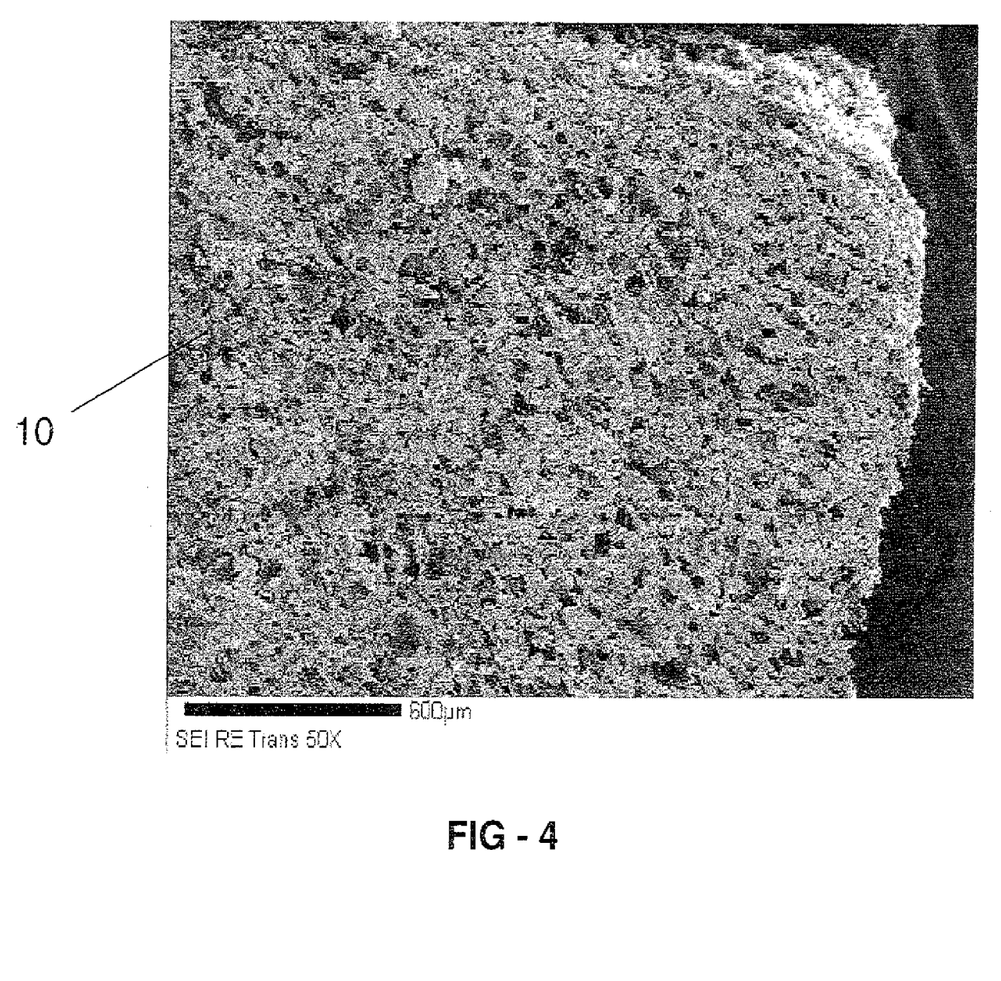
FIG. 4 is a scanning electron image of a ceramic article at a magnification of 50×.

The uncured ceramic article 14 may further comprise an additive component. The additive component typically comprises a filler. One skilled in the art typically selects the filler to control the density of the ceramic article 10. That is, the filler is typically included in the uncured ceramic article 14 according to the weight percent of ceramic particles and ceramic fibers 12 in the uncured ceramic article 14. The filler typically spaces out the ceramic particles and ceramic fibers 12 to provide the ceramic article 10 with desired density and to allow effective metal infiltration during formation of the metal matrix composite. The filler may be any filler known in the art. The filler is typically selected to burn off during heating, i.e., curing or sintering, of the ceramic article 10. The filler is typically selected from walnut shell flour, cellulose fiber, air, and combinations thereof. In one embodiment, the filler includes air to aid in curing the ceramic article 10 and to provide an open, porous ceramic article 10, as set forth in FIG. 4.

The filler is typically present in the uncured ceramic article 14 in an amount of from 0.5 to 20 parts by weight based on 100 parts by weight of solids in the uncured ceramic article 14. A suitable filler is walnut shell flour, commercially available under from Ecoshell of Corning, Calif.

The additive component may further comprise an air entrainment agent. The air entrainment agent may be any air entrainment agent known in the art that is compatible with the second component of the binder component. One skilled in the art typically selects the air entrainment agent to increase air bubble content in the ceramic article 10 and stabilize air bubble size to effect uniform air bubble distribution in the ceramic article 10. Without intending to be limited by theory, it is believed that the air entrainment agent decreases surface tension, optimizes dispersability, and contributes to the formation of fine, stable air bubbles to provide the open, porous ceramic article 10 that is receptive to metal infiltration, as set forth in FIG. 4. The air entrainment agent is typically present in the uncured ceramic article 14 in an amount of from 0.01 to 1 part by weight based on 100 parts by weight of solids in the uncured ceramic article 14. A suitable air entrainment agent is commercially available under the trade name Silipon® RN from Hercules of Wilmington, Del.

The additive component may further comprise a surfactant. The surfactant may be any known surfactant in the art that is compatible with the second component of the binder component. One skilled in the art typically selects the surfactant to lubricate the ceramic fibers 12 and ceramic particles. The surfactant is typically present in the uncured ceramic article 14 in an amount of from 0.01 to 1 part by weight based on 100 parts by weight of solids in the uncured ceramic article 14.

The additive component may further comprise a foam stabilizing agent. The foam stabilizing agent may be any known foam stabilizing agent in the art that is compatible with the second component of the binder component. One skilled in the art typically selects the foam stabilizing agent to minimize the formation of undesired air bubbles in the uncured ceramic article 14. The foam stabilizing agent is typically present in the uncured ceramic article 14 in an amount of from 0.01 to 1 part by weight based on 100 parts by weight of solids in the uncured ceramic article 14.

The additive component is typically present in the uncured ceramic article 14 in an amount of from 5 to 30 parts by weight based on 100 parts by weight of solids in the uncured ceramic article 14.

The method of forming the ceramic article 10 comprises the step of providing a composition comprising the ceramic particles and the ceramic fibers 12 having an aspect ratio of greater than 3:1. The composition may further comprise the binder component and the additive component.

Figure 7:
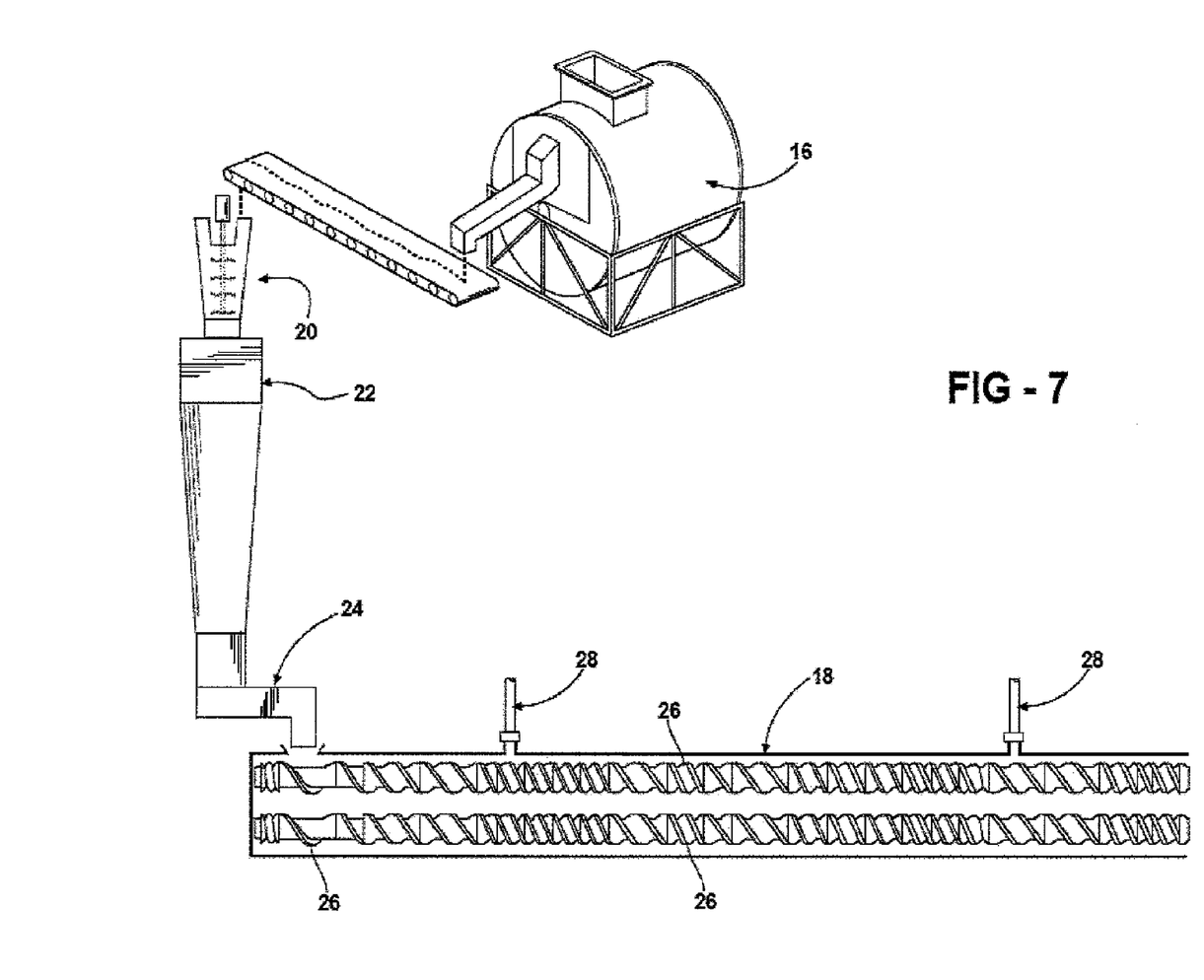
FIG. 7 is a schematic side view of a dry-mixing apparatus, an agitated hopper, a feeder, and a screw arrangement of the multi-screw extruder.

Referring to FIG. 7, the step of providing the composition is typically further defined as dry-mixing the ceramic particles and the ceramic fibers 12 to form the composition. A dry-mixing apparatus is schematically shown at 16. Without intending to be limited by theory, it is believed that dry-mixing the ceramic particles and the ceramic fibers 12 optimizes other processing steps, e.g., extruding, and provides a uniform dispersion of the ceramic particles, the ceramic fibers 12, the binder component, and the additive component in the composition. Dry-mixing also typically provides reaction time for the binder component and the additive component and avoids feeding individual component streams to processing equipment, thereby optimizing processing equipment throughput and minimizing processing equipment wear.

Dry-mixing is typically further defined as batch tumble blending the ceramic particles and the ceramic fibers 12 in the dry-mixing apparatus 16, i.e., a rotating vessel having at least two intermeshing flows. Without intending to be limited by theory, it is believed that the rotating vessel offers efficient and uniform solids mixing while optimizing energy consumption. The rotating vessel is typically rotated at about 60 Hz for from 1 to 3 minutes to dry-mix the composition. A suitable rotating vessel is commercially available under the trade name Rollo-Mixer® from Continental Products Corporation of Milwaukee, Wis.

The method may further comprise the step of introducing water to the composition. Water is typically introduced to the composition after dry-mixing the composition to provide the composition with a suitable consistency for other processing steps. Water is typically introduced to the composition in an amount of from 5 to 30 parts by weight based on 100 parts by weight of the composition. In one embodiment, water is introduced to the composition in an amount of about 12 parts by weight based on 100 parts by weight of the composition. Water is typically introduced to the composition as air-atomized particles via an air-atomizing nozzle for from 20 to 25 minutes to minimize solids agglomeration.

The method typically further comprises the step of conveying the composition to an extruder. The extruder is schematically shown at 18 in FIGS. 6 and 7. The step of conveying can include the step of agitating the composition. The composition is typically agitated by loading the composition into an agitated hopper, which is schematically shown at 20 in FIG. 7. Typically, the agitated hopper 20 is free from corners in which the composition may aggregate. For example, the agitated hopper 20 may have a conical upper portion and a cylindrical lower portion. The agitated hopper 20 is typically equipped with an agitator that sweeps the entire volume of the agitated hopper 20 to eliminate bridging of the composition in the agitated hopper 20. The agitator typically rotates at a speed and frequency designed to eliminate bridging without inducing shear to the composition. One skilled in the art typically minimizes shear in the conveying step since the composition has both cohesive and adhesive properties and is susceptible to compaction.

To further agitate the composition, the agitated hopper 20 typically provides a continuous supply of the composition to a feeder 22 comprising a vibratory tray 24. The feeder 22 typically controls the flow rate of the composition to the vibratory tray 24, and the vibratory tray 24 typically distributes the composition into a curtain pattern for feeding to the extruder 18.

Figure 6:
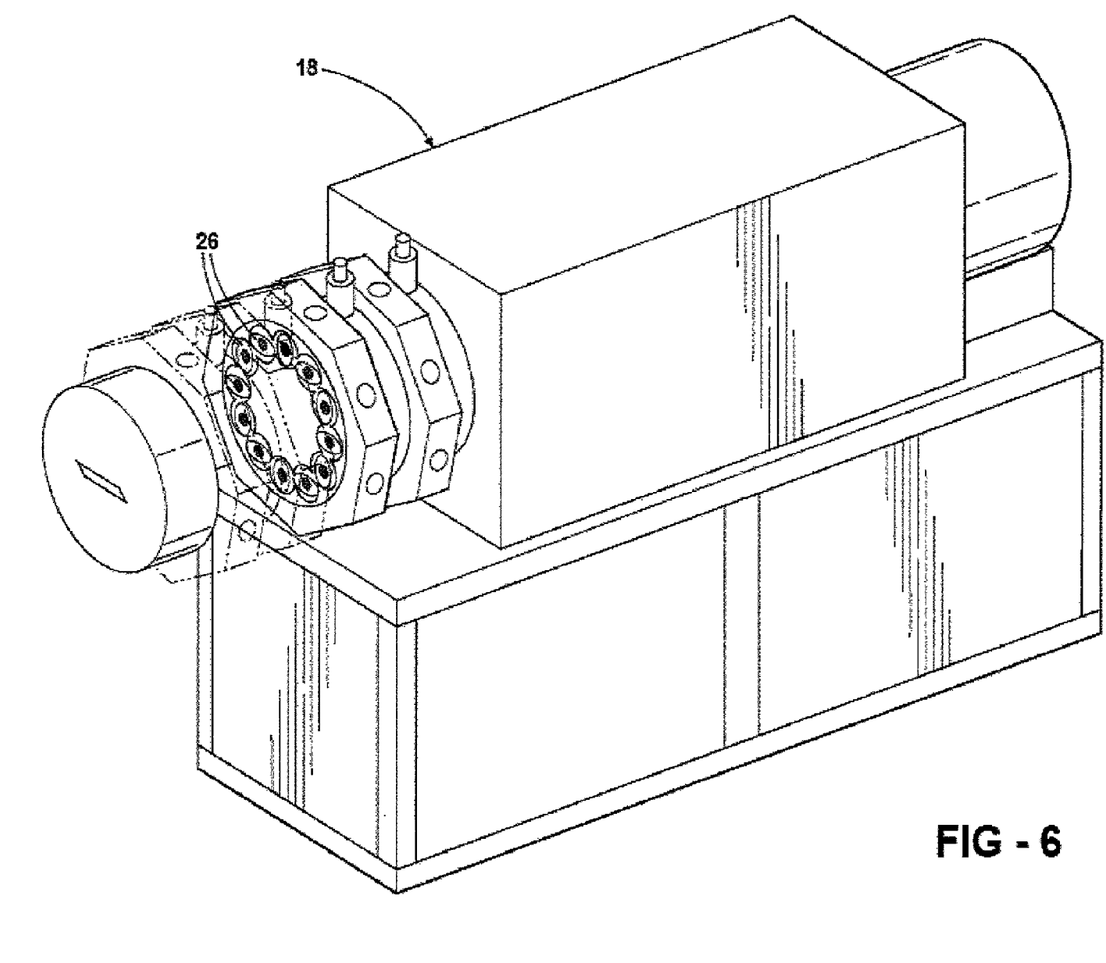
FIG. 6 is a perspective view of a multi-screw extruder for use in manufacturing the ceramic article.

As shown in FIGS. 6 and 7, the extruder 18 is preferably a multi-screw extruder 18 having at least three intermeshing screws 26. The step of conveying the composition typically includes the step of feeding the composition to the multi-screw extruder 18 at a flow rate of from 36 to 136, more typically 45 to 90 kg/hr. In one embodiment, the feeder 22 is a belt-type feeder. The belt-type feeder typically includes a belt having a width of from 30 to 60 cm and a belt speed of from 0.006 to 1.9 m/s. The belt-type feeder typically minimizes shear, plasticization, and agglomeration of the composition during conveying.

The composition is extruded through the multi-screw extruder 18 having at least three intermeshing screws 26 to form an extrudate. The multi-screw extruder 18 typically includes from 3 to 24, more typically from 10 to 12 screws 26 formed in a ring configuration. That is, the multi-screw extruder 18 is typically a ring extruder, as shown schematically in FIG. 7. The at least three intermeshing screws 26 are typically arranged in fixed positions in the ring, are typically geared to the same motor, and typically rotate at the same speed. The at least three intermeshing screws 26 may be co-rotating or counter-rotating.

The multi-screw extruder 18 typically has a modular design and comprises solid barrels and/or combination barrels. The combination barrels typically include ports 28 for injecting components or for venting volatile gases. One skilled in the art typically selects a combination of solid barrels and combination barrels to provide desired processing characteristics of the multi-screw extruder 18 and desired physical properties of the extrudate.

The multi-screw extruder 18 may also include flow blocking flights for providing separate mixing processes in the multi-screw extruder 18. The flow blocking flights may be flighted, and typically impede passing of the composition between sections of the multi-screw extruder 18. It is to be appreciated that certain flow blocking flights can be removed for increasing the feeding capability of the multi-screw extruder 18.

In one embodiment, the multi-screw extruder 18 has elements with missing flights to increase an amount of composition present in the multi-screw extruder 18. That is, certain flights are typically removed to a core of screw elements of the screw 26 to increase the feeding capability of the multi-screw extruder 18.

The multi-screw extruder 18 typically has from 2 to 8, more typically from 4 to 6 mixing zones. The multi-screw extruder 18 also typically has an L/D ratio of 18 to 56, more typically 20 to 44. A suitable multi-screw extruder is the 3+RingExtruder commercially available from Century, Inc. of Traverse City, Mich.

The step of extruding may be further defined as rotating the at least three intermeshing screws 26 at from 20 to 1,200, more typically 100 to 400 rpm. As the at least three intermeshing screws 26 rotate, the composition is conveyed, mixed, and advanced through the multi-screw extruder 18 until the composition exits the multi-screw extruder 18 through a shaping die (not shown) as an extrudate.

The multi-screw extruder 18 typically elongates and shears the composition to provide distributive and dispersive mixing to both substantially randomly orient the ceramic fibers 12 in three dimensions and substantially homogeneously distribute dispersed ceramic fibers 12 in the ceramic article 10. The step of extruding typically includes arranging adjacent ceramic fibers 12 in different dimensions so that adjacent ceramic fibers 12 arranged in different dimensions are present in the extrudate in an amount of greater than 85 parts by volume based on 100 parts by volume of the extrudate. That is, the multi-screw extruder 18 typically provides excellent elongational and low-intensity shear mixing that results in adjacent ceramic fibers 12 oriented in different dimensions in the extrudate.

The method may further comprise the step of adding water or the binder component in liquid form to the composition while the composition is disposed within the multi-screw extruder 18. Water and/or the binder component in liquid form are typically added to the composition via the ports 28 of the multi-screw extruder 18 to modify the physical properties of the extrudate and/or minimize wear of the multi-screw extruder 18.

The extrudate is heated to form the ceramic article 10. That is, the extrudate is cured, i.e., sintered, to form the ceramic article 10. It is to be appreciated that the extrudate may be manipulated to form a green form, i.e. the uncured ceramic article 14, prior to heating the extrudate to form the ceramic article 10. Specific parameters and processes for manipulating the extrudate to form the ceramic article 10 are set forth in co-pending U.S. Application Publication Nos. 2009/0309262 and 2009/0309252 and U.S. Pat. No. 7,793,703, the Applications of which are filed concurrently herewith.

The extrudate is typically heated to effect both drying and baking of the ceramic article 10. The extrudate is typically heated to a temperature of from 100 to 2,000° F. The extrudate may be heated in an oven or by an open heat source. Specific parameters and processes for heating the uncured ceramic article 14 are set forth in co-pending U.S. Patent Application Publication Nos. 2009/0309262 and 2009/0309252 and U.S. Pat. No. 7,793,703, the applications of which are filed concurrently herewith. The extrudate is typically dried to a temperature of from 70 to 200, more typically from 110 to 130° F. to bring the second component of the binder component to a gel point. The extrudate is typically baked at a temperature of from 450 to 700, more typically 475 to 525° F. for about 1 hour to burn off any organic binder and filler. The extrudate is typically cured or sintered at a temperature of from 1,600 to 2,000, more typically 1,700 to 1,900° F. for about 2 hours to set the inorganic binder and provide the ceramic article 10 with excellent strength at high temperatures. As set forth above, during curing or sintering, any liquid component of the uncured ceramic article 14 typically burns off, and solids remain in the ceramic article 10. Typically, solids in the ceramic article 10 include the ceramic fibers 12, the ceramic particles, and the inorganic binder of the binder component. That is, after curing or sintering, solids are typically present in the ceramic article 10 in an amount of from 20 to 50 parts by volume based on 100 parts by volume of the ceramic article 10. Solids are more typically present in the ceramic article 10 in an amount of from 30 to 40 parts by volume based on 100 parts by volume of the ceramic article 10. Air is typically present in the ceramic article 10 in an amount of from 50 to 80 parts by volume based on 100 parts by volume of the ceramic article 10. Air is more typically present in the ceramic article 10 in an amount of from 60 to 70 parts by volume based on 100 parts by volume of the ceramic article 10.

Without intending to be limited by theory, it is believed that the step of heating also substantially randomly orients and substantially homogeneously disperses the ceramic fibers 12 in the extrudate. That is, the heating typically evaporates water, burns off any organic binder and filler, and sets the inorganic binder so as to define void space in the extrudate.

The method also comprises the step of substantially randomly orienting the ceramic fibers 12 in three dimensions in the ceramic article 10. That is, the step of substantially randomly orienting the ceramic fibers 12 includes arranging adjacent ceramic fibers 12 in different dimensions so that adjacent ceramic fibers 12 arranged in different dimensions are present in the ceramic article 10 in an amount of greater than 85 parts by volume based on 100 parts by volume of the ceramic article 10. It is to be appreciated that the term substantially means that greater than 90 out of 100 ceramic fibers 12 are randomly oriented in three dimensions in the ceramic article 10. It is further to be appreciated that the term randomly oriented means that adjacent ceramic fibers 12 are disposed in different dimensions and that adjacent ceramic fibers 12 are free from a pattern of alignment.

The method may further comprise the step of substantially homogeneously dispersing the ceramic fibers 12 in the ceramic article 10. It is to be appreciated that the term substantially means greater than 90 out of 100 ceramic fibers 12 in the ceramic article 10 are homogeneously dispersed in the ceramic article 10. Further, it is to be appreciated that the term homogeneously dispersed means that greater than 85% by volume of the ceramic fibers 12 in the ceramic article 10 are uniformly distributed on a scale of twice the diameter of the ceramic fiber. That is, greater than 85 out of 100 ceramic fibers 12 are spaced at least one ceramic fiber diameter away from an adjacent ceramic fiber.

The step of substantially randomly orienting the ceramic fibers 12 and the step of substantially homogeneously dispersing the ceramic fibers 12 are typically simultaneous. That is, the multi-screw extruder 18 typically provides elongational and low-intensity shear mixing to both substantially randomly orient the ceramic fibers 12 in three dimensions and substantially homogeneously disperse the ceramic fibers 12 in the ceramic article 10 without excessive viscous energy dissipation and material heating. Without intending to be limited by theory, it is believed that effective dispersion of agglomerations of ceramic fibers 12 to individual ceramic fibers 12 and orientation of the ceramic fibers 12 typically minimizes infiltration blockages in the resulting ceramic article 10 caused by entanglement and conglomeration of the ceramic particles and ceramic fibers 12. The resulting ceramic article 10 is typically free from entanglements and conglomerations of ceramic fibers 12 that cause weak points that typically decrease strength and stiffness of ceramic articles 10.

Additionally, the step of substantially randomly orienting the ceramic fibers 12 and the step of heating are typically simultaneous. Without intending to be limited by theory, it is believed that the step of heating also substantially randomly orients and substantially homogeneously disperses the ceramic fibers 12 in the ceramic article 10. That is, the step of heating typically evaporates water, burns off of any organic binder and filler, and sets the inorganic binder so as to define void space in the ceramic article 10.

The step of substantially homogeneously dispersing the ceramic fibers 12 and the step of extruding are typically simultaneous. That is, the step of substantially homogeneously dispersing agglomerations of ceramic fibers 12 to individual ceramic fibers 12 and the step of extruding are typically simultaneous. The multi-screw extruder 18 typically provides elongational and low intensity shear mixing to substantially homogeneously disperse and distributes the ceramic fibers 12 in the extrudate.

The ceramic article 10 typically has a density of from 0.9 to 1.1 g/cm$^3$ and is typically suitable for applications requiring lightweight components. In a first embodiment, the ceramic article 10 is a hollow cylinder, as set forth in FIG. 1. The first embodiment is typically used to fabricate metal matrix composites to be used as drum brakes. The ceramic article 10 of the first embodiment typically exhibits consistent density, even while including ceramic fibers 12 having an aspect ratio of greater than 3:1, and provides excellent wear resistance to metal matrix composites, e.g., drum brakes. In a second embodiment, the ceramic article 10 is a connecting rod, as set forth in FIG. 3. The ceramic article 10 of the second embodiment typically exhibits excellent strength and stiffness.

EXAMPLES

The following examples are merely intended to illustrate the invention and are not to be viewed in any way as limiting to the scope of the invention.

A composition is formed according to the formulations listed in Table 1. The amounts in Table 1 are listed in pounds.

TABLE 1

Composition Formulations

| | Ex. 1 | Comparative Ex. 2 | Comparative Ex. 3 |
|---|---|---|---|
| Ceramic Particles A | 66.3 | 66.3 | 7.5 |
| Ceramic Fibers B | 13.3 | 13.3 | 1.5 |
| Binder Component | | | |
| Organic Binder - First Component C | 5.0 | 5.0 | 0.5 |
| Organic Binder - Second Component D | 2.5 | 2.5 | |
| Inorganic Binder E | 5.5 | 5.5 | 0.5 |
| Additive Component | | | |
| Filler F | 7.5 | 7.5 | |
| Air Entrainment Agent G | 0.01 | 0.01 | |
| Surfactant H | 0.12 | 0.12 | |
| Total | 100.2 | 100.2 | 10.0 |

Ceramic Particles A are silicon-carbide particles.
Ceramic Fibers B are alumina-silica fibers having an aspect ratio of 10:1.
Organic Binder - First Component C is starch.
Organic Binder - Second Component D is hydroxypropylmethylcellulose.
Inorganic Binder E is silica.
Filler F is walnut shell flour.
Air Entrainment Agent G is a combination of sulfuric acid, sodium salts, and alkyl esters having from 12 to 18 carbon atoms.
Surfactant H is glycerin.

In Example 1, a dry mixture of 66.3 pounds of Ceramic Particles A, 13.3 pounds of Ceramic Fibers B, a binder component comprising an organic binder including 5.0 pounds of First Component C and 2.5 pounds of Second Component D, and an additive component comprising 7.5 pounds of Filler F and 0.01 pounds of Air Entrainment Agent G is dry-mixed in a 5 ft$^3$ volume Mark VII RolloMixer® drum mixer, commercially available from Continental Products Corporation of Milwaukee, Wis., and rotated at 60 Hz for 2 minutes. Water, in a quantity of 12 parts by weight based on 100 parts of the dry mixture, and Surfactant H, in a quantity of 1 part by weight based on 100 parts of water, are added to the dry mixture over 25 minutes to form a premix composition of Example 1.

The premix composition of Example 1 is loaded into an agitated hopper. The agitated hopper delivers the premix composition onto a belt-type feeder. The belt-type feeder meters the premix composition onto a vibratory pan that distributes the premix composition into a curtain pattern for feeding to a 3+ RingExtruder multi-screw extruder having 12 screws, commercially available from Century, Inc. of Traverse City, Mich.

Additional water, in a quantity of 16.8 parts by weight based on 100 parts of the premix composition, and a solution of Inorganic Binder E in water, in a quantity of 13.75 parts by weight based on 100 parts of the premix composition, are added to the 3+ RingExtruder to form the composition of Example 1 that is extruded through the 3+ RingExtruder to form an extrudate.

The multi-screw extruder has 4 mixing zones and an L/D ratio of 32. The multi-screw extruder has 1 feed barrel, 1 custom liquid injection barrel, 2 combination barrels, 5 solid barrels that are channeled for effective chilled liquid cooling, 12 screw shafts equipped with 6 missing-flight screw elements, 6 transition missing-flight screw elements, segmented mixing, and conventional conveying screw elements. The 12 screws are rotated at from 100 to 150 rpm to mix and advance the composition through the multi-screw extruder 16 to form the extrudate.

In Comparative Example 2, a dry mixture of 66.3 pounds of Ceramic Particles A, 13.3 pounds of Ceramic Fibers B, a binder component comprising an organic binder including 5.0 pounds of First Component C and 2.5 pounds of Second Component D, and an additive component comprising 7.5 pounds of Filler F and 0.01 pounds of Air Entrainment Agent G is dry-mixed in the 5 ft$^3$ volume Mark VII RolloMixer® drum mixer, and rotated at 60 Hz for 2 minutes. The water, in a quantity of 12 parts by weight based on 100 parts of the dry mixture, and Surfactant H, in a quantity of 1 part by weight based on 100 parts of water, are added to the dry mixture over 25 minutes to form a premix composition of Comparative Example 2.

The premix composition of Example 2 is loaded into an agitated hopper. The agitated hopper delivers the premix composition onto a belt-type feeder. The belt-type feeder meters the premix composition onto a vibratory pan that distributes the premix composition into a curtain pattern for feeding to a twin-screw extruder having 2 screws, commercially available from Coperion Group GmbH of Stuttgart, Germany.

Additional water, in a quantity of 16.8 parts by weight based on 100 parts of the premix composition, and a solution of Inorganic Binder E in water, in a quantity of 13.75 parts by weight based on 100 parts of the premix composition, are added to the twin-screw extruder to form the composition of Example 2 that is extruded through the twin-screw extruder to form an extrudate. The twin-screw extruder has 2 mixing zones and an L/D ratio of 32. The twin-screw extruder has 1 feed barrel, 1 or more open barrels equipped with liquid injection adapter plugs, 3 to 5 solid barrels that are channeled for effective chilled liquid cooling, and 2 screw shafts with conventional conveying and mixing screw elements. The 2 screws are rotated at from 100 to 150 rpm to mix and advance the composition through the twin-screw extruder to form the extrudate.

In Comparative Example 3, a dry mixture of 7.5 pounds of Ceramic Particles A, 1.5 pounds of Ceramic Fibers B are mixed with 50 gallons of water to form a premix. A binder component comprising an organic binder including 0.5 pounds of First Component C is added to the premix and mixed for 5 minutes to disperse First Component C. Similarly, 0.5 pounds of Inorganic Binder E is added to the premix and mixed for an additional 5 minutes to form a composition of Comparative Example 3.

Ceramic articles of Example 4, Comparative Example 5, and Comparative Example 6 are formed from the corresponding compositions of Example 1, Comparative Example 2, and Comparative Example 3 according to the processing parameters summarized in Table 2 below.

TABLE 2

Ceramic Article Formation Parameters

|  | Ex. 4 | Comparative Ex. 5 | Comparative Ex. 6 |
| --- | --- | --- | --- |
| First Heating Temperature (° F.) | 140 | 140 | 140 |
| First Heating Duration (hours) | 48 | 48 | NA |
| Second Heating Temperature (° F.) | 500 | 500 | 500 |
| Second Heating Duration (hours) | 1 | 1 | 1 |
| Third Heating Temperature (° F.) | 1,800 | 1,800 | 1,800 |
| Third Heating Duration (hours) | 2 | 2 | 2 |

To form the ceramic article of Example 4, the extrudate of the composition of Example 1 is manipulated into a hollow cylinder according to processes as set forth in co-pending U.S. Patent Publication Nos. 2009/0309262 and 2009/0309252 and U.S. Pat. No. 7,793,703, the applications of which are filed concurrently herewith, to form a green form, i.e., an uncured ceramic article of Example 4. The uncured ceramic article of Example 4 is dried to a first heating temperature of 140° F. for 48 hours, baked at a second heating temperature of 500° F. for 1 hour, and fired at a third heating temperature of 1,800° C. for 2 hours to form the ceramic article of Example 4.

To form the ceramic article of Comparative Example 5, the extrudate of the composition of Comparative Example 2 is manipulated into a hollow cylinder according to processes as set forth in co-pending U.S. Patent Publication Nos. 2009/0309262 and 2009/0309252 and U.S. Pat. No. 7,793,703, the applications of which are filed concurrently herewith, to form a green form, i.e., an uncured ceramic article of Comparative Example 5. The uncured ceramic article of Comparative Example 5 is dried to a first heating temperature of 140° F. for 48 hours, baked at a second heating temperature of 500° F. for 1 hour, and fired at a third heating temperature of 1,800° F. for 2 hours to form the ceramic article of Comparative Example 5.

To form the ceramic article of Comparative Example 6, the composition of Comparative Example 3 is not extruded through an extruder to form an extrudate, but is rather vacuum formed into a hollow cylinder to form a green form, i.e., an uncured ceramic article of Comparative Example 6. The uncured ceramic article of Comparative Example 6 is dried to a first heating temperature of 140° F., baked at a second heating temperature of 500° F. for 1 hour, and fired at a third heating temperature of 1,800° F. for 2 hours to form the ceramic article of Comparative Example 6.

The properties of the ceramic articles of Example 4, Comparative Example 5, and Comparative Example 6 are listed in Table 3.

TABLE 3

Ceramic Article Properties

|  | Ex. 4 | Comparative Ex. 5 | Comparative Ex. 6 |
| --- | --- | --- | --- |
| Substantially randomly oriented ceramic fibers in three dimensions | Yes | No | No |
| Amount of adjacent ceramic fibers oriented in different dimensions (wt %) | >85 | <85 | <85 |
| Amount of adjacent ceramic fibers oriented in the same dimension (wt %) | <5 | >5 | >5 |
| Substantially homogeneously dispersed ceramic fibers | Yes | No | No |
| Consistent density at positions 1, 2, and 3 (g/cm$^3$) | Yes | No | No |
| Uniform strength in x-, y-, and z-dimensions (MPa) | Yes | No | No |

Scanning electron images of the ceramic articles of Example 4, Comparative Example 5, and Comparative Example 6 are prepared with a Philips XL40 Environmental Scanning Electron Microscope (ESEM). The scanning electron images are evaluated visually to determine whether the ceramic articles of Example 4, Comparative Example 5, and Comparative Example 6 have substantially randomly oriented ceramic fibers in three dimensions and substantially homogeneously dispersed ceramic fibers. The amount of adjacent ceramic fibers oriented in the same and different dimensions present in the ceramic articles based on 100 parts by volume of the ceramic articles is determined by visually evaluating the scanning electron images of Example 4, Comparative Example 5, and Comparative Example 6. The scanning electron images are also evaluated visually to determine whether the ceramic articles of Example 4, Comparative Example 5, and Comparative Example 6 have substantially consistent density at three positions, i.e., positions 1, 2, and 3, corresponding to an x-, y-, and z-dimension. The strength of the ceramic article in each dimension is measured in accordance with ASTM C1424 Standard Test Method for Monotonic Compressive Strength of Advanced Ceramics at Ambient Temperature.

The ceramic article of Example 4 formed from the composition of Example 1 that is extruded through the 3+RingExtruder has substantially randomly oriented ceramic fibers and includes ceramic fibers having an aspect ratio of 10:1. In contrast, the ceramic articles of Comparative Example 5 and Comparative Example 6, which are formed from the compositions of Comparative Examples 2 and 3, respectively, and which are not extruded through the 3+RingExtruder, only exhibit ceramic fibers primarily oriented in two dimensions. Consequently, the ceramic article of Example 4 exhibits uniform strength in three dimensions. In contrast, the ceramic articles of Comparative Example 5 and Comparative Example 6 do not exhibit uniform strength in three dimensions.

The ceramic article of Example 4 exhibits consistent density, even while including the ceramic fibers having an aspect ratio of 10:1 of the composition of Example 1. In contrast, the ceramic articles of Comparative Example 5 and Comparative Example 6 exhibit inconsistent density and comprise the ceramic fibers having an aspect ratio of 10:1 of Comparative Examples 2 and 3, respectively. Therefore, the ceramic article of Example 4 exhibits consistent density as a result of consistent mixing and uniform distribution of the ceramic particles and the ceramic fibers provided by extrusion of the composition of Example 1 through the 3+RingExtruder. In contrast, the ceramic articles of Comparative Examples 5 and 6 exhibit inconsistent mixing and nonuniform distribution of the ceramic particles and the ceramic fibers. Consequently, the ceramic articles of Comparative Example 5 and Comparative Example 6 wear more readily than the ceramic article of Example 4.

Additionally, the ceramic article of Example 4 exhibits excellent strength and stiffness as compared to the ceramic articles of Comparative Examples 5 and 6. Also, as compared to the ceramic articles of Comparative Examples 5 and 6, the ceramic article of Example 4 has excellent porosity and minimal weak points and infiltration blockages caused by entanglement and conglomeration so as to enable excellent metal infiltration for efficient production of metal matrix composites.

Additionally, the ceramic article of Example 4 comprises Second Component D, whereas the ceramic article of Comparative Example 6 is free from Second Component D. Second Component D exhibits reverse thermal gelation and provides lubricity during formation of the ceramic article of Example 4. Second Component D also provides surface activity, plasticity, uniform rheology, and uniform distribution of air during formation of the ceramic article of Example 4, and provides an uncured ceramic article of Example 4 with strength. In contrast, an uncured ceramic article of Comparative Example 6 suffers from nonuniform distribution of air. As such, the uncured ceramic article of Comparative Example 6 exhibits less optimal strength.

Similarly, the ceramic article of Example 4 comprises Filler F, Air Entrainment Agent G, and Surfactant H. In comparison, the ceramic article of Comparative Example 6 is free from Filler F, Air Entrainment Agent G, and Surfactant H. Filler F spaces out the Ceramic Particles A and Ceramic Fibers B of the composition of Example 1 to provide the ceramic article of Example 4 with excellent density to allow effective metal infiltration during formation of a metal matrix composite. In contrast, the ceramic article of Comparative Example 6 does not exhibit excellent density and is less desirable for use during formation of a metal matrix composite.

Air Entrainment Agent G increases air bubble content in the ceramic article of Example 4 and stabilizes air bubble size to effect uniform air bubble distribution in the ceramic article of Example 4. Air Entrainment Agent G decreases surface tension, optimizes dispersability, and contributes to the formation of fine, stable air bubbles to provide the open, porous ceramic article of Example 4 that is receptive to metal infiltration. In contrast, the ceramic article of Comparative Example 6, which is free from Air Entrainment Agent H, is less porous. Therefore, the ceramic article of Comparative Example 6 is less receptive to metal infiltration when compared to the ceramic article of Example 4.

Finally, Surfactant G lubricates Ceramic Particles A and Ceramic Fibers B of the composition of Example 1 during the formation of the ceramic article of Example 4. In contrast, Ceramic Particles A and Ceramic Fibers B of the composition of Comparative Example 3, which is free from Surfactant G, are less optimally lubricated during the formation of the ceramic article of Comparative Example 6. As such, the ceramic article of Comparative Example 6 does not exhibit excellent density and is less desirable for use during formation of a metal matrix composite.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A ceramic article comprising:
ceramic particles;
ceramic fibers having an aspect ratio of greater than or equal to 10:1; and
an inorganic binder comprising silica;
wherein greater than 90 out of 100 ceramic fibers are randomly oriented in three dimensions in said ceramic article,
wherein greater than 85 out of 100 ceramic fibers are spaced at least one ceramic fiber diameter away from an adjacent ceramic fiber, and
wherein said ceramic article has a consistent density of from 0.9 to 1.1 g/cm$^3$ in x-, y-, and z-dimensions and has a uniform strength in three dimensions as measured in accordance with ASTM C1424.

2. A ceramic article as set forth in claim 1 wherein said ceramic fibers are present in said ceramic article in an amount of from 3 to 15 parts by volume based on 100 parts by volume of said ceramic article.

3. A ceramic article as set forth in claim 2 wherein said ceramic fibers comprise an element from period 2, 3, 4, or 5 of the periodic table of the elements.

4. A ceramic article as set forth in claim 2 wherein said ceramic fibers comprise aluminum, silicon, oxygen, zirconium, or carbon.

5. A ceramic article as set forth in claim 1 wherein said ceramic fibers are selected from the group of alumina-silica fibers, alumina-silica-zirconia fibers, carbon-graphite fibers, and combinations thereof.

6. A ceramic article as set forth in claim 1 wherein said ceramic particles are present in said ceramic article in an amount of from 15 to 30 parts by volume based on 100 parts by volume of said ceramic article.

7. A ceramic article as set forth in claim 6 wherein said ceramic particles comprise an element from period 2, 3, or 4 of the periodic table of the elements.

8. A ceramic article as set forth in claim 6 wherein said ceramic particles comprise silicon, oxygen, carbon, aluminum, or boron.

9. A ceramic article as set forth in claim 1 wherein said ceramic particles are selected from the group of silicon carbide, alumina, boron carbide, and combinations thereof.

10. A ceramic article as set forth in claim 1 further comprising an additive component.

11. A ceramic article as set forth in claim 10 wherein said additive component comprises a filler.

12. A ceramic article as set forth in claim 1 that is a hollow cylinder.

13. A ceramic article as set forth in claim 8 that is a hollow cylinder.

14. A metal matrix composite comprising:
a ceramic article comprising:
ceramic particles;
ceramic fibers having an aspect ratio of greater than or equal to 10:1; and
an inorganic binder comprising silica;
wherein greater than 90 out of 100 ceramic fibers are randomly oriented in three dimensions in said ceramic article,
wherein greater than 85 out of 100 ceramic fibers are spaced at least one ceramic fiber diameter away from an adjacent ceramic fiber, and
wherein said ceramic article has a consistent density of from 0.9 to 1.1 g/cm$^3$ in
x-, y-, and z-dimensions and has a uniform strength in three dimensions as measured in accordance with ASTM C1424; and
a metal infiltrated in said ceramic article.

15. A metal matrix composite as set forth in claim 14 wherein said ceramic fibers are present in said ceramic article in an amount of from 3 to 15 parts by volume based on 100 parts by volume of said ceramic article.

16. A metal matrix composite as set forth in claim 15 wherein said ceramic fibers comprise an element from period 2, 3, 4, or 5 of the periodic table of the elements.

17. A metal matrix composite as set forth in claim 15 said ceramic fibers comprise aluminum, silicon, oxygen, zirconium, or carbon.

18. A metal matrix composite as set forth in claim 15 wherein said ceramic fibers are selected from the group of alumina-silica fibers, alumina-silica-zirconia fibers, carbon-graphite fibers, and combinations thereof.

19. A metal matrix composite as set forth in claim 14 wherein said ceramic particles are present in said ceramic article in an amount of from 15 to 30 parts by volume based on 100 parts by volume of said ceramic article.

20. A metal matrix composite as set forth in claim 19 wherein said ceramic particles are selected from the group of silicon carbide, alumina, boron carbide, and combinations thereof.

* * * * *